Sept. 8, 1925.  C. E. CUNNIUS  1,552,545
TIRE RIM REMOVING TOOL
Filed May 8, 1924
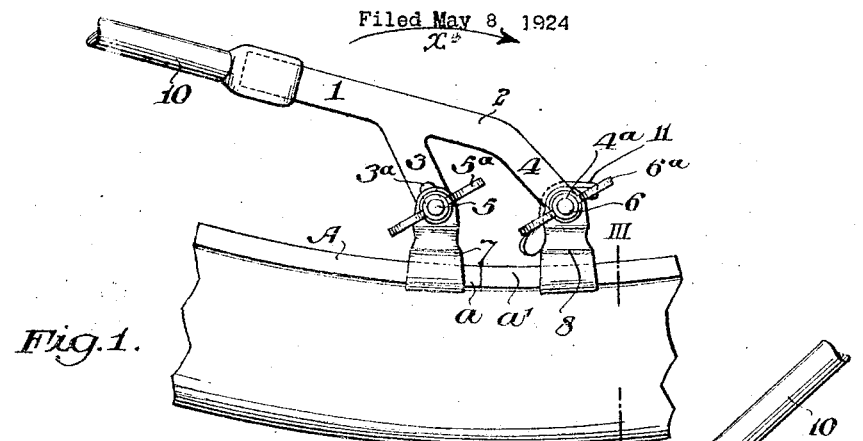
Fig. 1.
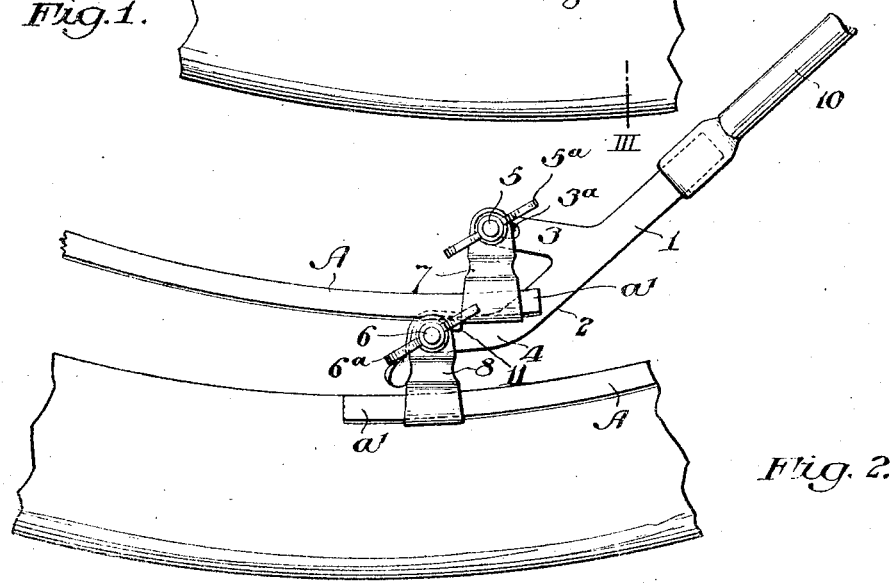
Fig. 2.
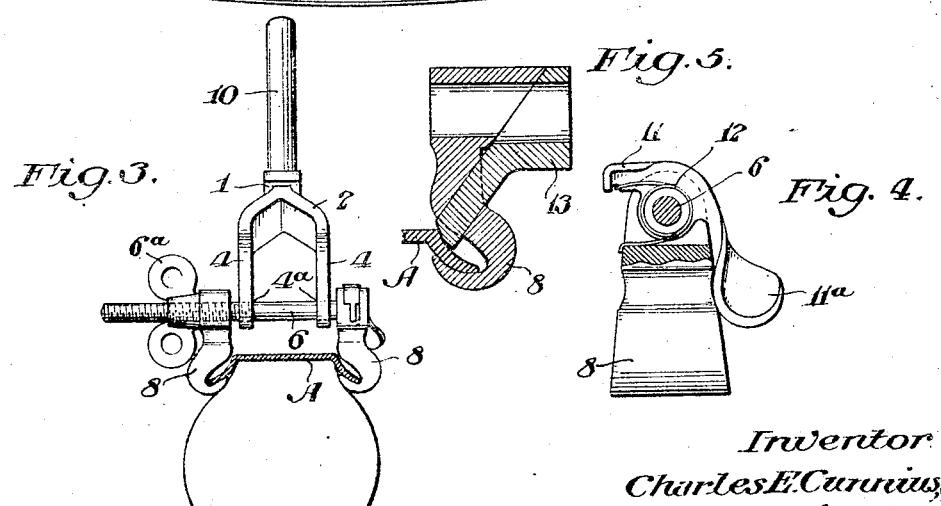
Fig. 3.
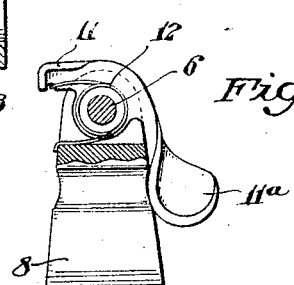
Fig. 5.
Fig. 4.
Inventor
Charles E. Cunnius,
By Murray Béyer
Attorney.

Patented Sept. 8, 1925.

1,552,545

UNITED STATES PATENT OFFICE.

CHARLES E. CUNNIUS, OF PORT CARBON, PENNSYLVANIA.

TIRE-RIM-REMOVING TOOL.

Application filed May 8, 1924. Serial No. 711,813.

*To all whom it may concern:*

Be it known that I, CHARLES E. CUNNIUS, a citizen of the United States, and a resident of Port Carbon, Schuylkill County, Pennsylvania, have invented certain new and useful Improvements in Tire-Rim-Removing Tools, of which the following is a specification.

The object of my invention is to provide a simple and efficient member for displacing the meeting edges of a tire rim with respect to each other in order that such rim may be removed from the tire.

A further object of my invention is to provide a unitary member having pairs of arms adapted to carry bolts from which hooked gripping members may depend; such hooked members being adapted for engagement with the tire rim against which they may be tightened by turning down suitable nuts carried by the bolts against certain of said hooks.

A further object of my invention is to provide a member that may be turned over after the hooked members have been clamped to the rim by employing one of the bolts as the fulcrum for such movement; such action serving to separate the meeting ends of the rim and displace one end with respect to the other so that such rim may be removed from the tire. In such position the unitary structure carrying the clamping hooks is held against return to its normal position by means of a safety catch which may be carried by one of said clamping hooks; the parts being held in displaced position until it is desired to restore the rim to the tire, such safety hook constituting a further feature of my invention.

And a further object of my invention is to provide the hook members with an adjustable retaining bolt which may engage the rim above the hooked portion, being retained in position by tightening the bolt supporting the hooked member.

These and other features of my invention are more fully described hereinafter; reference being had to the accompanying drawings, in which:

Figure 1, is a view in elevation of a portion of a rim and the tire to which it is secured, showing my improved tool in position ready to displace one of the meeting ends of said rim with respect to the other so that the rim may be removed.

Fig. 2, is a view similar to Fig. 1, showing the meeting ends of the rim in the displaced position.

Fig. 3, is a cross sectional view on the line III—III, Fig. 1.

Fig. 4, is a side elevation of one of the clamping hooks showing the safety catch applied thereto; and Fig. 5, is a sectional view illustrating a locking bolt carried by the hooked member.

The tool or device forming the subject of my invention comprises a body 1, with a forked end comprising prongs 2; each prong having pairs of arms depending or extending diagonally therefrom, and indicated at 3 and 4; the arms 4 depending from the ends of said forked portion.

The several arms are apertured at $3^a$ and $4^a$ for the reception of bolts 5 and 6, and these bolts carry clamping hook members 7 and 8, respectively, outside the arms. The apertures $3^a$ of the arms 3 are in the form of slots permitting slight relative movement of the body 1 with respect to the bolt 5. The bolts carry thumb nuts $5^a$ and $6^a$, and after the hooked members have been placed in engagement with the rim A, adjacent to the meeting ends $a$ and $a'$, of the same, said hooked members are securely held in clamping engagement therewith by turning down said thumb nuts on the bolts against the hooked members.

The tool is provided with a handle 10, which may be offset with respect to the longitudinal axis of the body 1 so as to pass outside of the tire and this handle is of sufficient length to provide the desired leverage. After the hooked members are securely clamped in place against the rim, the tool is turned to the right in the direction of the arrow $x$, the bolt 6 being employed as a fulcrum. When the tool has been partly turned toward the position indicated in Fig. 2, the end of the rim to the left of the meeting point will be lifted and then by continued movement of the tool to the position of Fig. 2, the rim will be slightly curled and pulled out of contact with the tire so that it can be completely removed therefrom.

When the structure is moved to the position indicated in Fig. 2, the tool will be automatically locked in such position by means of a safety catch 11, carried by one of the clamping hooks 8; such catch having a hub surrounding the bolt 6, supporting the same, and a coiled spring 12, surrounding such hub to hold it in the operative position against one of the hook members 7, as shown in Fig. 2. In addition, the catch has an operative thumb piece 11ª, which may be moved so as to displace the safety catch with respect to the hooked member 7, when it is desired to restore the rim to the tire.

In applying the clamping hooks to the rim, the slotted portions 3ª of the arms 3 are so positioned that the bolt passing through the same occupies the lower portion of said slots. When the tool is lifted by means of the handle 10, and moved to the right, the hooked members 7 will be raised and carry up with them the end $a$ of the rim so that upon further movement of the tool in the direction of the arrow $x$, it is an easy matter to so distort the rim temporarily as to render removal from the tire a simple matter.

When it is desired to restore the rim to the tire, it is only necessary to place the same in the partially collapsed position with respect to the tire, and then, after releasing the catch 11, by pressure on the thumb-piece 11ª, to restore the tool to the position indicated in Fig. 1, whereupon the rim will spring into proper position with respect to the tire. Should the end $a$ partially overlie the end $a'$, slight downward pressure upon the handle will cause the arms 3 to move relatively to the bolt 5, by reason of the slots 3ª, and cause backward movement of the hooked members 7 which carry the end $a$ so that it may drop into position.

In some instances the size or width of the edge of the rim is such that it may be desirable to lock the clamping hook members thereto in order that definite engagement therewith is assured since otherwise a standard size hook might not engage all rims and in utilizing a full sized hook on certain sized rims there might be danger of the parts becoming separated. To avoid this difficulty, I may provide the clamping hooks with slidable catches or bolts 13, angularly disposed, and passing through an aperture in the web of the same to engage with the top of the rim after the hook has been brought into contact therewith; thereby affording an additional clamping means between the hook and the rim. These members 13 are slotted for passage of the bolt; the slot permitting vertical adjustment for various sized rims.

I claim:

1. A tool for removing rims from tires, comprising a body member having a bifurcated end with two sets of oppositely disposed arms carried thereby; one set of such arms being continuous with the legs of said bifurcated end and both sets of arms being apertured, bolts carried by each set of arms extending between the same and disposed in said apertures, hooked clamping members carried by said bolts outside said arms, and means carried by the bolts for holding the clamping members in clamping position with respect to the rim; one set of arms being slotted to permit slight lost motion of said body with respect to the bolt carrying one set of the clamping members.

2. A tool for removing tires from rims, comprising a forked body member with oppositely disposed ends lying diagonally with respect to the greater portion of the forked body, arms carried by each leg of the fork a short distance back from the ends of the same and also extending diagonally from said legs; each of said diagonally extending members being apertured in the ends of the same and the apertures formed in the ends of said arms being elongated; bolts carried by said apertured members, sets of hooked clamping members carried by said bolts outside the apertured members, and means carried by the bolts for independently holding said sets of clamping members in engagement with the respective meeting ends of the rim; said forked body being adapted to be turned whereby one of the meeting ends of the rim with which it is connected may be displaced with respect to the other.

3. The combination, in a tire rim removing tool, of a forked body member having oppositely disposed ends lying diagonally with respect to the body, arms carried by each leg of the fork a short distance back from the ends of the same; said arms extending diagonally from the legs; each of said diagonally extending members being apertured in the ends of the same and the apertures formed in the arms being elongated, bolts carried by said apertured members, sets of hooked clamping members carried by said bolts outside the apertured members, means carried by the bolts for independently holding said sets of clamping members in engagement with the respective meeting ends of the rim; said forked body being adapted to be turned in line with the bifurcated end whereby one of the meeting ends of the rim with which it is connected may be displaced with respect to the other, and a releasable safety catch mounted on one of said bolts for engagement with one of said clamping members and serving to hold the tool against movement when the rim is in the displaced position.

4. The combination, in a tire rim removing tool, of a bifurcated body member; each leg of such body having pairs of oppositely disposed projections or arms extending diagonally with respect thereto and having apertured ends, bolts passing through the apertured ends of said arms, hooked clamping members carried by said bolts outside the arms, nuts carried by the bolts for holding said hooked members in clamping position with respect to the rim on opposite sides of the meeting ends of the same, and a releasable safety catch journaled on one of said bolts and mounted for engagement with one of the clamping members carried by the other to hold the tool against movement when the rim is in the displaced position.

In witness whereof I have signed this specification.

CHARLES E. CUNNIUS.